US011486796B2

(12) United States Patent
Martin

(10) Patent No.: US 11,486,796 B2
(45) Date of Patent: Nov. 1, 2022

(54) BRAKE AND ACCELERATOR ROBOT

(71) Applicant: Anthony Best Dynamics Ltd., Wiltshire (GB)

(72) Inventor: Colin Martin, Bath Somerset (GB)

(73) Assignee: Anthony Best Dynamics Ltd., Wiltshire (GB)

( * ) Notice: Subject to any disclaimer, the term of this patent is extended or adjusted under 35 U.S.C. 154(b) by 73 days.

(21) Appl. No.: 16/962,939

(22) PCT Filed: Jan. 15, 2019

(86) PCT No.: PCT/GB2019/050105
§ 371 (c)(1),
(2) Date: Jul. 17, 2020

(87) PCT Pub. No.: WO2019/141976
PCT Pub. Date: Jul. 25, 2019

(65) Prior Publication Data
US 2020/0340884 A1 Oct. 29, 2020

(30) Foreign Application Priority Data
Jan. 17, 2018 (GB) .................................. 1800766.6

(51) Int. Cl.
*G01M 17/007* (2006.01)
*B60K 26/02* (2006.01)
(Continued)

(52) U.S. Cl.
CPC ........... *G01M 17/007* (2013.01); *B60K 26/02* (2013.01); *B60T 7/12* (2013.01); *B60T 7/16* (2013.01);
(Continued)

(58) Field of Classification Search
CPC .. G01M 17/007; G01M 99/005; B60K 26/02; B60T 7/16; B60T 17/223; B60T 7/12
See application file for complete search history.

(56) References Cited

U.S. PATENT DOCUMENTS

| 3,662,593 A | 5/1972 | Pirrello et al. |
| 4,742,720 A * | 5/1988 | Storck ...................... B62D 1/00 |
| | | 73/116.01 |

(Continued)

FOREIGN PATENT DOCUMENTS

| CN | 1120861 A | 4/1996 |
| CN | 101088794 A | 12/2007 |

(Continued)

OTHER PUBLICATIONS

International Search Report dated May 2, 2019 for Appl. No. PCT/GB2019/050105, 2 pages.
(Continued)

*Primary Examiner* — Terence Boes
(74) *Attorney, Agent, or Firm* — Sterne, Kessler, Goldstein & Fox P.L.L.C.

(57) ABSTRACT

A robot has brake and accelerator actuating levers (9, 10) and a rotary actuator (12) between them. A drive ring (16) is fast with an actuator drive member (14) and between them they captivate a journal bearing (17) for the brake actuating lever (9) on which a return spring (19) acts. Advance of the lever is via a cam member (31) adjacent it. Wherever the output drive member (14) from the rotary actuator is turned, the cam member is rotated correspondingly. For brake application, the drive member (14) is driven, clockwise in FIG. 2. For brake release, and accelerator application, the drive member is driven back and the cam member is disengaged from the lever (9) with unidirectional freedom. The drive ring (16) is carried on a central 'clutch' member (35). The central member (35) is journalled in a fixed clutch member (36), which carries a clutch operating winding (38) for clutching together the central member (35) and an accelerator drive member (39) journalled on the central member. A central drive shaft (41) is fast with the accelerator drive member (39) and passes through the length of the rotary actuator. When the winding is energised, rotation of the output drive member (14) is transferred to this central drive shaft (41) for the accelerator actuating lever (10) as well.

16 Claims, 4 Drawing Sheets

(51) Int. Cl.
*B60T 17/22* (2006.01)
*B60T 7/12* (2006.01)
*B60T 7/16* (2006.01)
*G01M 99/00* (2011.01)

(52) U.S. Cl.
CPC ......... *B60T 17/223* (2013.01); *G01M 99/005* (2013.01)

(56) References Cited

U.S. PATENT DOCUMENTS

| | | | | |
|---|---|---|---|---|
| 5,417,127 A * | 5/1995 | Bueti | ................ | B60K 26/00 |
| | | | | 74/532 |
| 2002/0053497 A1 | 5/2002 | Stahl | | |
| 2003/0164057 A1 * | 9/2003 | Buckley | ................ | A63B 55/61 |
| | | | | 74/512 |
| 2011/0126642 A1 * | 6/2011 | Stahle | ................ | B60T 17/223 |
| | | | | 73/862.634 |
| 2015/0283900 A1 * | 10/2015 | Wells | ................ | B60K 26/02 |
| | | | | 29/401.1 |
| 2016/0377508 A1 * | 12/2016 | Perrone | ................ | B60W 10/184 |
| | | | | 180/204 |

FOREIGN PATENT DOCUMENTS

| | | |
|---|---|---|
| CN | 101994789 A | 3/2011 |
| CN | 103818254 A | 5/2014 |
| CN | 207089006 | 3/2018 |
| CN | 207843100 | 9/2018 |
| JP | 2017-220117 A | 12/2017 |

OTHER PUBLICATIONS

Written Opinion dated May 2, 2019 for Appl. No. PCT/GB2019/050105, 8 pages.

* cited by examiner

BRAKE AND ACCELERATOR ROBOT

The present invention relates to a brake and accelerator robot.

Brake and accelerator robots are used for repetitive, reproducible testing of vehicles.

Generally they employ levers for actuating the brake and accelerator pedals via push rods. Our existing robot has a rotary actuator mounted at floor level and a drive arrangement mounted on top of the motor. This can be uncomfortable for a driver in the vehicle for emergency control of the vehicle and/or driving it to the beginning of a test, for instance.

The object of the present invention is to provide an improved brake and accelerator robot According to the invention there is provided a brake and accelerator robot, comprising:
- a brake actuating lever,
- an accelerator actuating lever,
- a rotary actuator, for driving the respective levers for applying the brake and the accelerator,
- means for connecting drive from the rotary actuator to the respective levers, wherein the levers are arranged at opposite ends of the rotary actuator with drive for one of the levers passing through the rotary actuator from an output member at one end to the lever at the other end.

Preferably the drive connection means includes a direction reverser whereby rotation of the actuator in one direction moves the brake actuating lever to depress a brake pedal and rotation of the actuator in another direction moves the accelerator actuating lever to depress an accelerator pedal.

Conveniently the direction reverser is arranged to reverse the rotary actuator's direction for moving the accelerator actuating lever. Further, it is convenient for the accelerator actuating lever to be the one having its drive passing through the rotary actuator.

With the provision of the direction reverser, it can be envisaged that the two actuating levers could be permanently geared together to move in direct opposition to each other. For this, push rods between the levers and the pedals could be provided with unidirectional freedom, whereby withdrawal of the respective levers from positions corresponding to the rest positions of the pedals is accommodated. Alternatively the unidirectional freedom can be provided in the robot per se, whereby adjustably fixed length push rods can be used.

By unidirectional freedom is meant either angular or translational freedom for respective parts to withdraw from each other when moved in one sense, but to be in driving contact when moved in the other sense by contact of internal abutments.

As an alternative to unidirectional freedom, the drive connection means can be provided with one or more clutches between the rotary actuator and the or each actuating lever.

In the preferred embodiment, the brake actuating lever is operated via a unidirectional freedom cam for transmitting a high force/low displacement action to the brake pedal, whereas a clutch and a geared-up reverser is provided for transmitting a lower force/higher displacement action to the accelerator.

The preferred embodiment includes a drive member from the actuator fastened to a brake actuating lever driver and to a centrally journalled member. The actuator has a casing fast with a base of the robot as also is a journal for the central member. The brake actuating member is journalled on the assembly of the drive member, the lever driver and the journalled member. A spring is provided for returning the brake actuating lever to a stop corresponding to release of the brake pedal and allowing the lever driver to be further withdrawn in unidirectional freedom when the accelerator is depressed.

To help understanding of the invention, a specific embodiment thereof will now be described by way of example and with reference to the accompanying drawings, in which.

Figure 1:
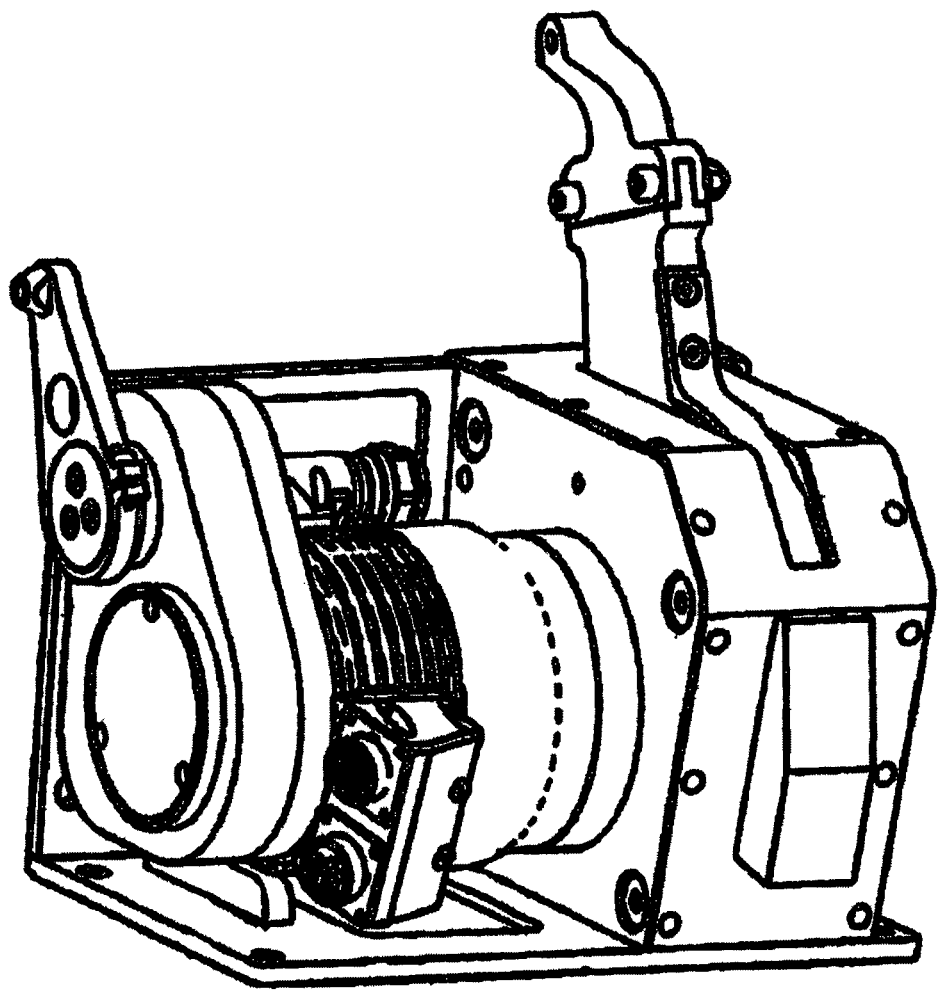
FIG. 1 is a perspective view of a brake and accelerator robot in accordance with the invention.

Referring to the drawings, the brake and accelerator robot 1 has a base 2 comprising bottom and back plates 3,4 fitted together as an L angle. Brake end outer & inner plates 5,6 and an accelerator end bracket 7 are fastened to the plates. An accelerator end housing 8 is fastened to the end bracket 7. A brake actuating lever 9 is journalled between the brake end plates 5,6 and an accelerator actuating lever 10 is journalled in the housing 8.

Between the levers, an outer casing 11 of a rotary actuator 12 is fast with the inner end plate 6. The actuator has an electric motor and a reduction gearbox, typically a harmonic drive, for substantial speed reduction, typically of the order of 100:1. Being a commercially available assembly, neither the motor nor the gearbox are described or shown separately. An output drive member 14 extends through the inner plate 6.

A drive ring 16 is fast with the drive member 14 and between them they captivate the inner race of a journal bearing 17 for the brake actuating lever 9. A fixed support ring 15, a polymeric bearing ring 18 and a return spring 19 for the lever 9 are provided for normally returning the lever to abut a stop 20 between the end plates 5,6. Away from the plates 3,4, the gap between the plates 5,6 is closed by a cover 21. It has a slot 22 for the lever 9, closed by a tang 23 fixed to the lever, to avoid clothing etc. being trapped. It will be appreciated that the lever can be advanced, to depress a brake pedal via a push rod (neither shown), the push rod being pinned to the lever, against the return force of the spring which normally returns it against the stop at a seat 24.

Advance is via a cam member 31 having a roller 32 abutting, when advanced, against a seat 33 inwards of the seat 24. The cam member is arranged adjacent the brake actuating lever 9, is spaced from it by a retainer 34 for the outer race of the bearing 17 and is fast with the drive ring 16. The arrangement is such that wherever the output drive member 14 from the rotary actuator is turned, the cam member is rotated correspondingly. For brake application, the drive member 14 is driven, clockwise in FIG. 2, by the actuator and with it the cam member 31, which drives the brake actuating lever 9. For brake release, and accelerator application, the drive member is driven back and the cam member is disengaged from the lever 9 with unidirectional freedom between the roller 32 and the seat 33. The drive ring 16 is carried on a central 'clutch' member 35, so called as explained below.

The central member 35 is journalled in a fixed clutch member 36, held fast by a disc 37 let into the outer end plate 5. The fixed member carries a clutch operating winding 38 for clutching together the central member 35 and an accelerator drive member 39 journalled on the central member. A central drive shaft 41 is fast with the accelerator drive member 39 and passes through the length of the rotary actuator. When the winding is energised, rotation of the output drive member 14 is transferred to this central drive shaft 41 for the accelerator actuating lever 10 as well. It will however be appreciated that, as in conventional driving when either the accelerator is depressed or separately the brake is depressed, the central shaft is only clutched to the actuator when the cam member 31 is backed off from the brake actuating lever 9 with unidirectional freedom, i.e. when the brake actuating lever is not advanced.

Figure 2:
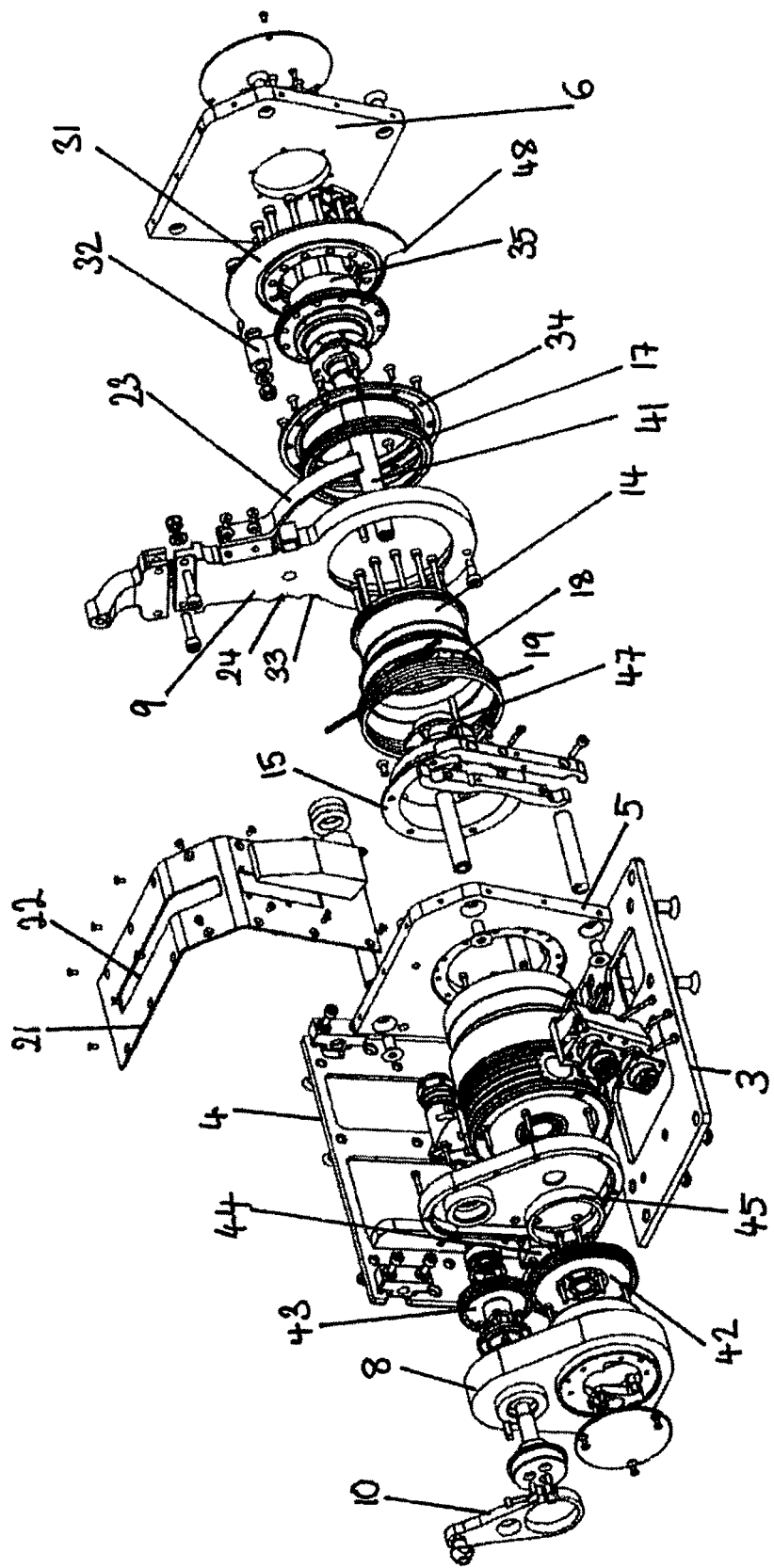
FIG. 2 is an exploded view of the robot of FIG. 1 from a similar angle.
Figure 3:
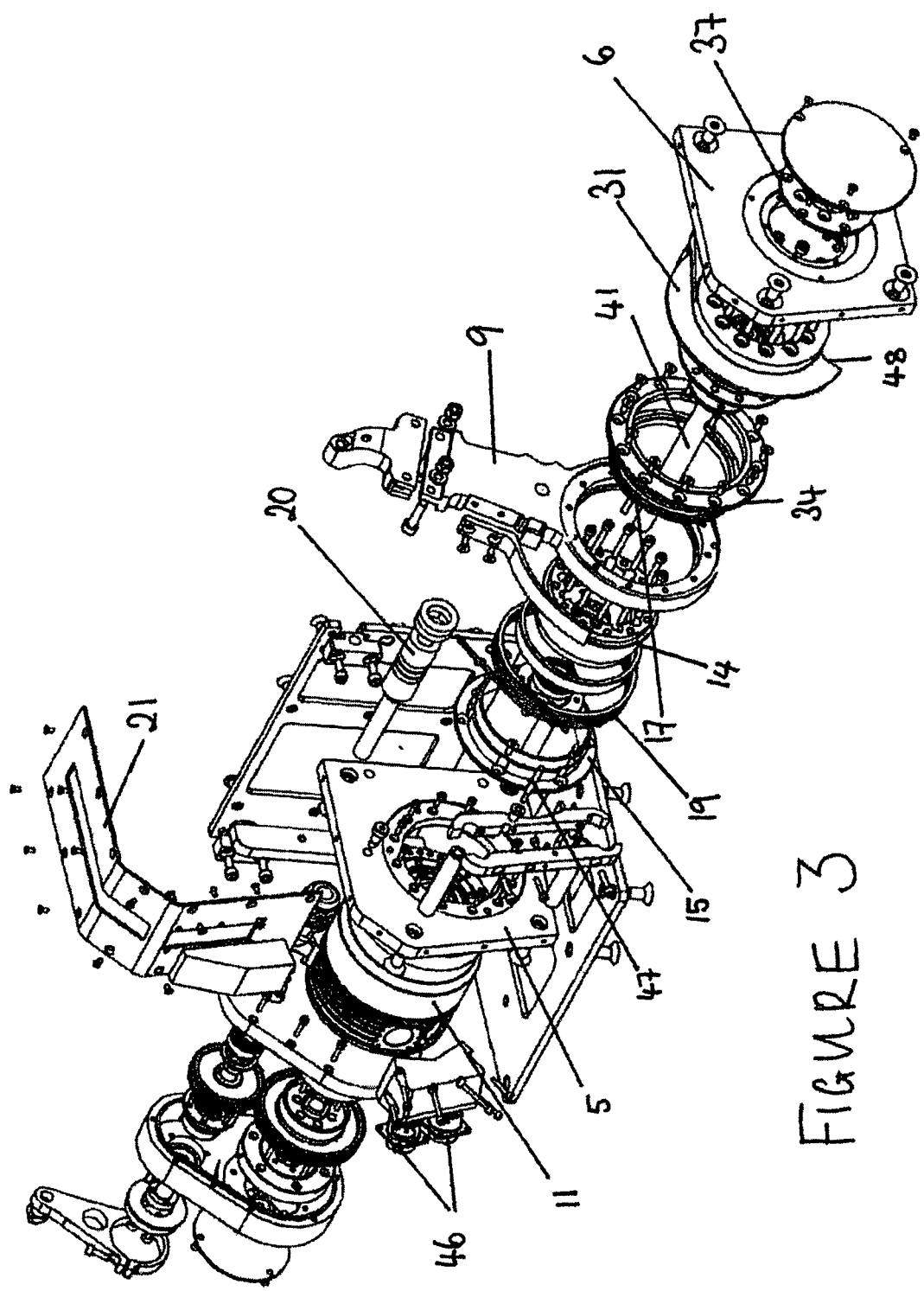
FIG. 3 is a similar view to FIG. 2, but from the opposite end of the robot.
Figure 4:
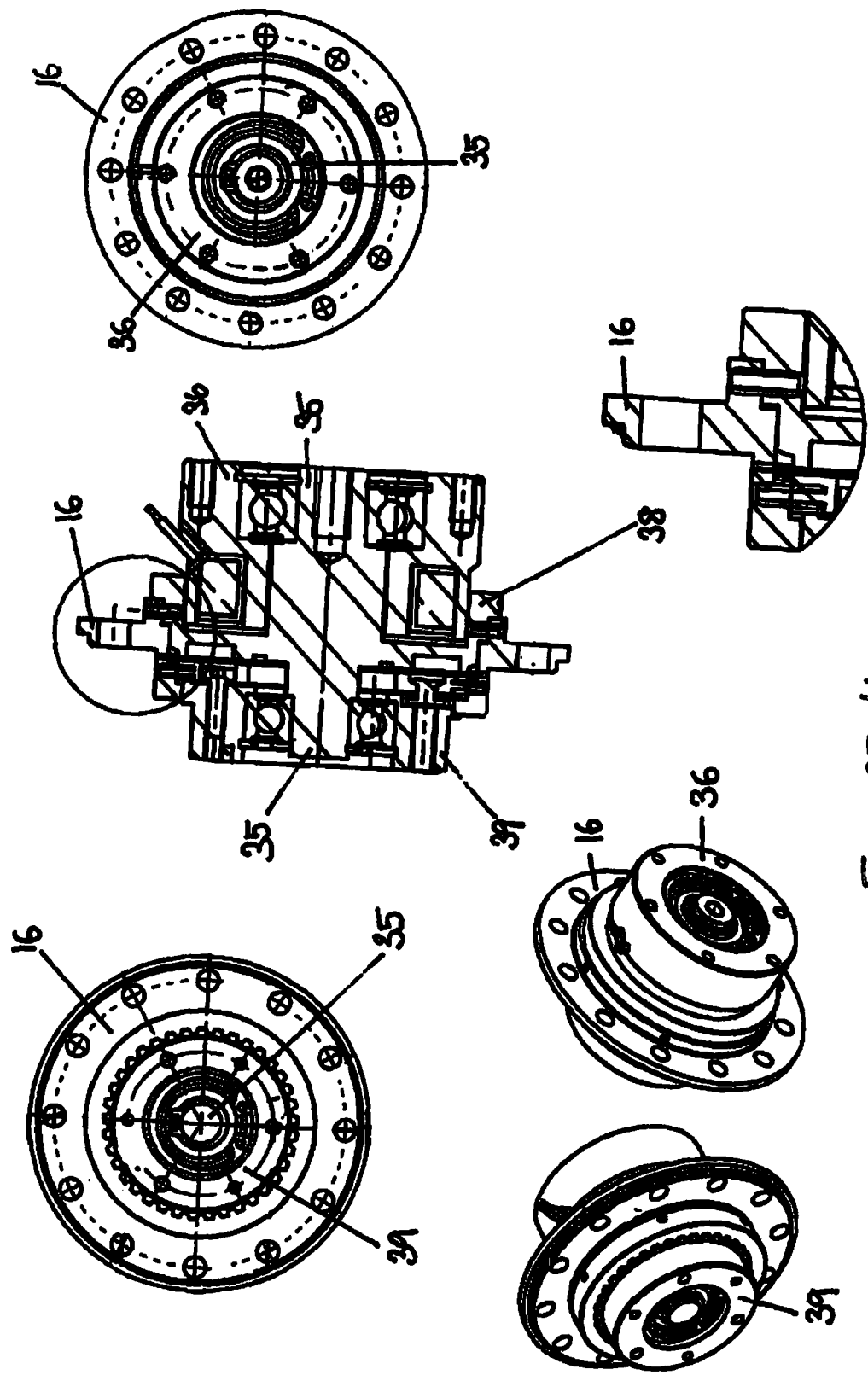
FIG. 4 is a multi-view drawing of a clutch for the robot of FIG. 1.

The central shaft passes to the accelerator end housing 8, in which are journalled a meshed pair of gear wheels 42,43. The first 42 is fast with the central shaft 41 and the second 43 with the accelerator actuating lever 10. Bearing in mind that the brake end cam member 31 can be backed off from the brake actuating lever, it will be understood that because of the reversing action of the two gear wheels driving of the rotary actuator in the brake back off direction causes advance of the accelerator actuating lever. When driving in this rotation, i.e. anti-clockwise in FIG. 2, is continued with the clutch engaged, the accelerator actuating lever will be advanced in the accelerator depression direction. It will be noted that the lever gear wheel 43 has less teeth than the driving one 42, whereby the rotational velocity of the accelerator actuating lever is greater than that of the brake actuating lever.

Thus both the brake and the accelerator can be actuated with driving rotation of the rotary actuator in opposite directions. The actuator has an internal encoder, whereby control circuitry can apply the brakes to a desired extent in accordance with the encoder's count, following a set up procedure which will be within the capability of the skilled reader or at least that of a control engineer.

The accelerator is engageable at a random angular position of the clutched components with the result that the rotary actuator's encoder cannot be used for determining the position of accelerator, at least after a brake application involving a clutch disengagement. Accordingly an accelerator position encoder 44 is provided in the housing 8, with an encoding wheel 45, fast with the gear wheel 42 and the central drive shaft 41. It is a finer pitch device than the gear wheel 42, enabling fine accelerator control. Control and powering of the robot is via ports 46.

For zeroing of the robot, a proximity switch 47 is provided for detecting a radial edge 48 on the cam member 31.

It should be particularly noted that the robot as described is intended to be used in "non-driverless" testing, i.e. when a driver is present in the vehicle to be tested. For such testing, the pushrods between the accelerator and brake actuating levers will be telescopic so that the accelerator and brake pedals can be depressed beyond their current robotically controlled position. The robot has particular advantage in such testing because it is little higher, apart from the actuating levers as such, than the height of the actuator, comprising the motor and gearbox. Thus the robot can be placed in front of a driver's seat of a low built car and used without interference with the driver's legs.

The invention is not intended to be restricted to the details of the above described robot. For instance, the accelerator actuating lever could be provided with a return spring, but this is not found necessary in practice due to accelerator pedals being sprung, particularly bearing in mind that the clutch is intended to be disengaged when the accelerator is not intended to be depressed. Equally the brake actuating lever return spring could be dispensed with in theory. However this could result in a brake drag.

The invention claimed is:

1. A brake and accelerator robot, comprising:
   a brake actuating lever;
   an accelerator actuating lever; and
   a rotary actuator, for driving the respective levers for applying the brake and the accelerator,
   wherein a drive from the rotary actuator is connected to the respective levers, and
   wherein the levers are arranged at opposite ends of the rotary actuator with a drive for one of the levers passing through the rotary actuator from an output member at one end to the lever at the other end.

2. The brake and accelerator robot of claim 1, wherein the drive from the rotary actuator is connected by a direction reverser whereby rotation of the rotary actuator in one direction moves the brake actuating lever for brake pedal depression and rotation of the actuator in another direction moves the accelerator actuating lever for accelerator pedal depression.

3. The brake and accelerator robot of claim 2, wherein the direction reverser is arranged to reverse the rotary actuator's direction for moving the accelerator actuating lever.

4. The brake and accelerator robot of claim 1, wherein it is the accelerator actuating lever that has its drive passing through the rotary actuator.

5. The brake and accelerator robot of claim 1, wherein the two actuating levers are permanently geared together to move in direct opposition to each other.

6. The brake and accelerator robot of claim 5, wherein there are provided push rods between the levers and brake and accelerator pedals, the push rods being provided with unidirectional freedom, whereby withdrawal of the respective levers from positions corresponding to the rest positions of the pedals is accommodated.

7. The brake and accelerator robot of claim 1, wherein the brake and accelerator actuating levers are provided with unidirectional freedom, whereby adjustable fixed length push rods are used.

8. The brake and accelerator robot of claim 1, wherein one or more clutches is provided between the rotary actuator and the or each actuating lever to connect the drive from the rotary actuator.

9. The brake and accelerator robot of claim 1, wherein the brake actuating lever is operated via a unidirectional freedom cam for transmitting displacement action to the brake pedal and a clutch is provided for transmitting a displacement action to the accelerator.

10. The brake and accelerator robot of claim 9, including a drive member from the actuator fastened to a brake actuating lever driver for driving the brake actuating lever with unidirectional freedom and to a centrally journalled member for driving the accelerator actuating lever via the clutch.

11. The brake and accelerator robot of claim 10, wherein the brake actuating lever is journalled on the assembly of the drive member, the lever driver and the centrally journalled member.

12. The brake and accelerator robot of claim 11, including a spring for returning the brake actuating lever to a stop corresponding to release of the brake pedal and allowing the lever driver to be further withdrawn in unidirectional freedom when the accelerator is depressed.

13. The brake and accelerator robot of claim 10, wherein the clutch is arranged to transmit the accelerator displacement action from the centrally journalled member to a shaft passing through the rotary actuator.

14. The brake and accelerator robot of claim 13, wherein the clutch includes an electro-magnetic winding in a fixed member to which the central member is journalled for clutching together the central member and an accelerator drive member fast with the shaft passing through the rotary actuator.

15. The brake and accelerator robot of claim 1, further comprising:
- a drive member from the actuator fastened to a brake actuating lever driver for driving the brake actuating lever with unidirectional freedom and to a centrally journalled member for driving the accelerator actuating lever via a clutch;
- an encoder for encoding the position of the accelerator actuating lever; and
- a detector for detecting a radially extending edge of the brake actuating lever driver,
- wherein the drive connection means includes a direction reverser whereby rotation of the rotary actuator in one direction moves the brake actuating lever for brake pedal depression and rotation of the actuator in another direction moves the accelerator actuating lever for accelerator pedal depression,
- wherein the brake actuating lever is operated via a unidirectional freedom cam for transmitting displacement action to the brake pedal and the clutch is provided for transmitting a displacement action to the accelerator, and
- wherein the clutch is arranged to transmit the accelerator displacement action from the centrally journalled member to a shaft passing through the rotary actuator.

16. The brake and accelerator robot of claim 9, including push rods between the two actuating levers and brake and accelerator pedals, the push rods being be provided with unidirectional freedom, whereby a driver can over-ride the robot.

* * * * *